United States Patent

[11] 3,570,705

| [72] | Inventor | Mohamed R. Yazdani (Known as Ruholah Yazdani) Kassravi<br>Mount Carmel Rubber Factory Ltd. P. O. Box 1701, Dar Es Salaam, Tanzania |
|---|---|---|
| [21] | Appl. No. | 728,987 |
| [22] | Filed | May 14, 1968 |
| [45] | Patented | Mar. 16, 1971 |
| [32] | Priority | May 17, 1967 |
| [33] | | Great Britain |
| [31] | | 23,000/67 |

[54] CARGO CONTAINERS
2 Claims, 1 Drawing Fig.

[52] U.S. Cl. .................................................. 220/63, 220/85, 280/5
[51] Int. Cl. .................................................. B65d 25/18, B65p 3/22
[50] Field of Search .................................. 220/1.5, 5, 5 (A), 63, 85 (B), 85 (A); 280/5; 150/0.5

[56] References Cited
UNITED STATES PATENTS

| 2,623,565 | 12/1952 | Unthank | 150/0.5 |
| 2,775,360 | 12/1956 | Phillips | 220/84x |
| 2,798,639 | 7/1957 | Urban | 220/85(B) |
| 2,916,058 | 12/1959 | Unthank | 220/85(B)x |

FOREIGN PATENTS

| 540,876 | 3/1956 | Italy | 220/63 |

*Primary Examiner*—George E. Lowrance
*Attorney*—Jones & Lockwood

ABSTRACT: A cargo container comprises a base, a platform capable of bearing a load, guide means permitting of movement of the platform relative to the base between a lower, collapsed position and an upper, erected position, and a tank having flexible, liquid, impermeable sidewalls between the underside of the platform and the base.

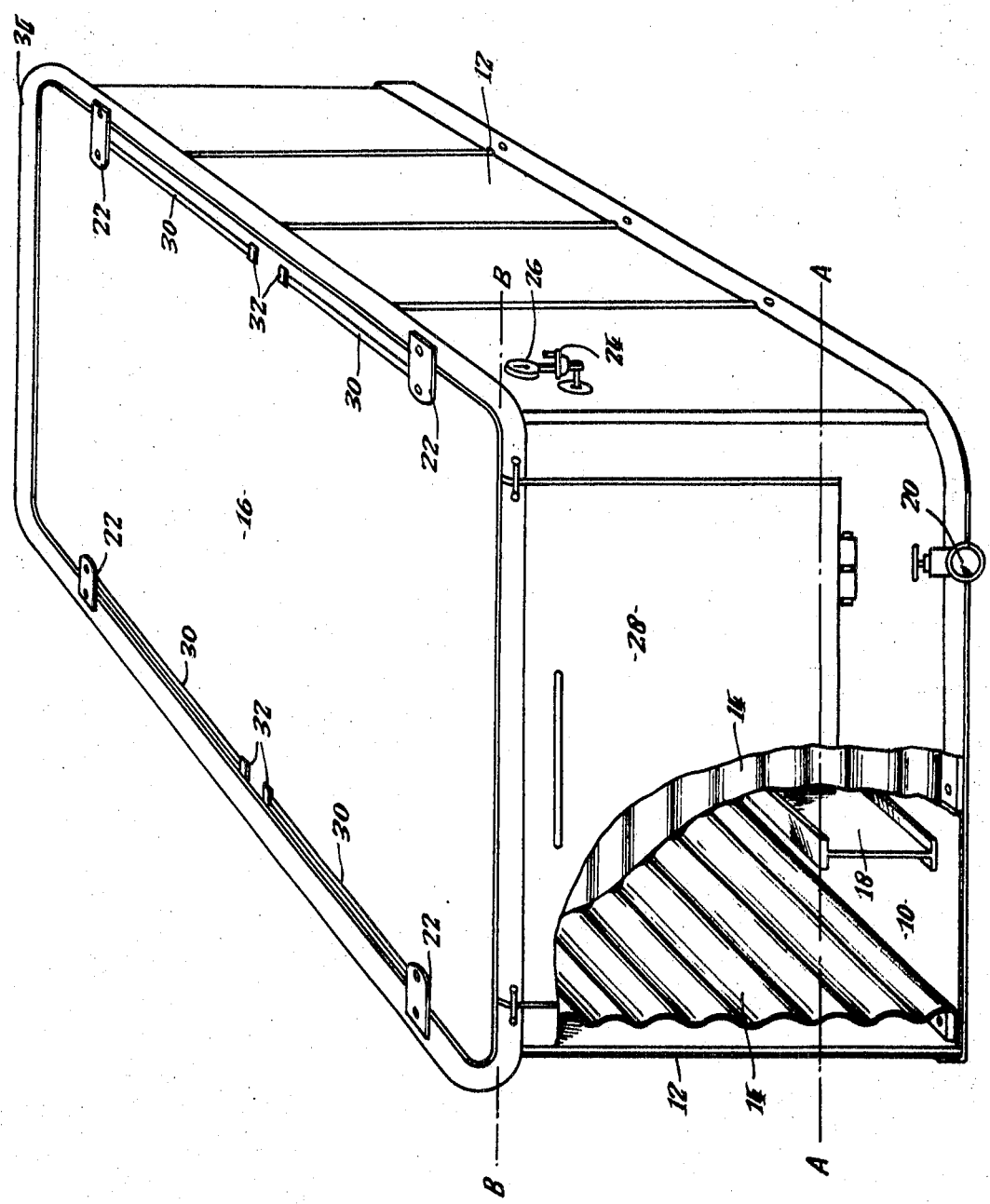

CARGO CONTAINERS

This invention relates to cargo containers and in particular it relates to a cargo container suitable for transporting or storing petrol, oil, milk, liquid fertilizer liquid chemicals, water or the like.

Liquids are normally transported in bulk, where the use of a pipe line is impracticable, in vehicles, aircraft or ships fitted with rigid tanks. One of the major factors contributing to the expense of transporting liquids in bulk in such a specially constructed tankers is that, once having delivered their load, whether by sea, by air, by road or by rail, they must usually make the return trip empty.

It is an object of the present invention to provide a bulk liquid container which may be fitted to a vehicle, such as a lorry, the vehicle being capable of carrying a useful load of solid material when the container is empty of liquid.

According to the present invention I provide a cargo container comprising a base, a platform capable of bearing a load, guide means permitting of movement of the platform relative to the base between a lower, collapsed position and an upper, erected position, and a tank having flexible, liquid-impermeable sidewalls between the underside of the platform and the base. Support means may be provided to space the platform from the base when the platform is in its lower position. The container may have platform-locating means to secure the platform in its upper position. The locating means may include a plurality of vertical pins adapted to interengage in corresponding locating holes, the pins being attached to said guide means and the holes being provided in the platform or vice versa. Bracing means may be provided to secure the platform in its lower position; such bracing means may be adjustable so that the platform may be secured at positions intermediate its upper and lower positions. The bracing means may cooperate with the pins and the holes to secure the platform in the desired position. The base may be provided with a substantially vertical framework adapted to guide the platform in its movement between the lower and upper positions, which framework may be provided with cladding panels to form rigid outer walls.

The base of the cargo container may itself form part of a lorry or railway truck or other form of land, sea or air transport. Alternatively the container may be a separate entity which can be secured to or loaded on or in the vehicle or other form of transport by which it is to be conveyed.

One embodiment of the present invention will now be described with reference to the accompanying drawing which shows a partially cutaway perspective view of a cargo container constructed in accordance with the present invention.

Referring to the drawing the cargo container has a base plate or floor 10 and upstanding rigid sidewalls 12 consisting of a vertical framework and cladding panels. The base plate 10 can be fixed to the chassis of a lorry (in a manner not shown) and also serves as the bottom plate of the tank whose sidewalls 14 are made of a flexible fluid impermeable material and are pleated with a series of horizontal corrugations so as to permit the sidewalls to collapse in concertinalike fashion. The roof of the tank is formed by a movable platform 16 which is reinforced so as to be capable of carrying a load and withstanding the pressure of the liquid inside the tank. The movable platform 16 serves as a rigid protective shield and may slide up and down inside the rigid sidewalls 12 which serve to guide it.

On top of the base plate 10 there are mounted longitudinal I-section girders 18 (only one of which is shown in the drawing). These I-section girders 18 provide a firm support for the movable platform 16 when it is in its lowest position (designated by the line A–A in the drawing).

Thus, when the tank is empty, the movable platform 16 rests on top of the I-section girders 18, and is secured in a manner which will be described hereafter. The height of the girders 18 permits the flexible corrugated sidewalls 14 to pack away in concertina fashion beneath the movable platform 16. The girders 18 act as spacers to space the platform or protective shield 16 above the base or floor 10 whereby a dead space is provided. Liquid may be pumped in through a valve 20. As the liquid is pumped in so the movable platform 16 rises until it reaches its highest position (shown by the line B–B in the drawing), at which brackets 22 hold the platform firmly in position. A valve 24 is connected to the top of the tank by a flexible hose (not shown) and permits the release of air within the tank; a pressure gauge 26 is provided to allow the pressure inside the tank to be measured. Loading is continued with the valve 24 open until all the air remaining in the tank has been expelled and liquid commences to flow out of valve 24. Valve 24 is then shut and more liquid pumped in until the correct pressure is reached at which the flexible sidewalls 14 are pressed against the rigid outer sidewalls 12, when the valve 20 is closed. If the tank is correctly filled and substantially air free, slopping and surging of liquid within the tank is minimized with the consequent minimization of the danger to the stability of the vehicle.

When the tank vehicle with its full load reaches its destination, the contents of the tank can be discharged through the valve 20, the air release valve 24 being opened to permit the tank to be drained to the fullest extent.

When the tank is empty, the movable platform 16 will be in its lowest position (A–A), in which it may be clamped with the aid of a number of bracing elements 30. Bracing elements 30 are hinged at their upper ends to the brackets 22 and, when the platform 16 is in its upper position, elements 30 are swung up out of the way as shown in the drawing. In the lower position of the platform, the lower ends 32 rest on the platform 16 and screw adjustment means (not shown) can be provided to lengthen or shorten the elements 30 so as to ensure that the platform 16 is firmly secured in this position. The lorry is then ready to be loaded, like any other lorry, with any desired solid material on top of the platform 16. A door 28 in the end wall of the housing can be opened to facilitate the loading and offloading of solid material on to the lorry.

A manhole (not shown) can be provided in the platform to permit access to the inside of the tank for inspection, cleaning or repair.

In an alternative embodiment the top edge of the sidewalls 12 has an inwardly directed flange (in place of the outwardly directed flange 34 of the container shown in the drawing). At intervals around this inwardly directed flange are arranged a series of downwardly projecting pins and the platform 16 has a corresponding series of holes around its periphery into which the pins may engage when the platform 16 is in its upper, erected position to locate the platform 16. In place of the bracing members 30 a number of composite adjustable bracing members are provided; each of these has three parts, an upper part with a socket into which a pin on the flange may fit, a middle part, and a lower part which incorporates a jack and has a peg to fit in the hole corresponding to the chosen pin in the platform. Middle parts of various lengths are provided so that the platform may be secured at its lower position (with the longest middle part) by suitable adjustment of the jack or at any position intermediate its erected and collapsed positions with the aid of shorter middle parts. With this arrangement of container a lorry can make a series of calls and make deliveries of liquid at each stop. After each delivery the platform can be secured in position and the slopping and surging of liquid in the tank can be minimized however however much liquid the tank contains.

In one arrangement the air vent pipe leading to the valve 24 passes up through the base 10 of the tank and a length of flexible pipe extends to the top of the tank where it is connected to one end of a rigid terminal pipe in the form of an inverted U, the free end of which is substantially flush with the roof of the tank. Conveniently this U-shaped pipe is mounted in the manhole cover (if one is provided). One end of a helical spring is attached to the midpoint of the length of flexible pipe within the tank and the other end is attached to the roof of the tank. This spring is so positioned that when the platform is in its lower, collapsed position the flexible pipe is stowed between the platform and the base so however as not to be interposed upon any load-bearing member, such as a girder 18, and to prevent the flexible pipe being damaged by being nipped between the platform and the girder.

The material from which the flexible sidewalls 14 are made should be chosen to suit the liquid that it is intended to transport. Thus if, for example, the tank is intended to carry oil, it should be made of the best available grade of oil-resisting rubber in which case the top edge portion of the sidewalls may be nylon-reinforced. Alternatively the sidewalls may be made from flexible steel sheets. It is true that the life of the tank may be less than the life of a rigid metal tank but this disadvantage will usually be compensated by the fact that the lorries may carry a useful load both on the outward and return trips. Other rubber or plastics materials may be suitable for other applications.

Other expedients that have been proposed to enable a lorry to be used for transporting liquids such as oil on one journey and solids on another have included the use of loose rubber bags which are filled and carried on the platform of a conventional lorry; on the return journey, when the bags are empty, they are folded up to enable the lorry to load other materials. The use of rubber bags is to some extent unsatisfactory since the motion of the lorry cc can cause friction between the platform of a conventional lorry and the rubber bags which may result in the production of holes in the bags. Puncturing of the bags may also occur through rough handling on unloading the lorry. In addition, on rough roads flying stones or other objects may cause punctures in the loose rubber bags. On the other hand it is true to say that the provision of a tank constructed in accordance with the present invention adds somewhat to the weight of the lorry.

Since the flexible tank is inside a metal housing, it is protected from external damaging influences, such as rough handling, sunshine and the impact of flying stones. In addition loading and unloading is simplified since the tank is a fixed part of the vehicle.

It is envisaged that the pressure inside the tank when it is fully loaded should be about 2.5 pounds per square inch. It is possible to test whether or not the tank has a leak in it and to check that the valves are properly closed by pressurizing the tank with air to a pressure of about 5 pounds per square inch before it is filled with the liquid; if the tank has a leak then the pressure inside the tank will gradually drop.

The metal panels of the sidewalls 12 can be unbolted and removed to permit access to the flexible sidewalls 14. If there is a hole in a flexible sidewall this can be repaired with a hot patch after the platform 16 has been unbolted and removed so as to allow access to both sides of the hole; alternatively a man may enter the tank through the manhole (if provided) thus obviating the need to remove the platform 16.

If desired a cargo container may be constructed in accordance with the invention in which there are a number of tanks (e.g. two, three or four) with flexible sidewalls; in this case each tank has a separate platform and the compartments are separated by rigid walls which can be hinged out of the way against the rigid sidewalls 12 when the platforms are in their lower collapsed positions.

In the case of a container intended for carriage upon, or incorporation into, a railway truck it may be more convenient to provide a door (corresponding to door 28 of the container of the drawing) in one of the longer sidewalls rather than in the narrower end wall in order to facilitate loading of the truck with solid materials.

If desired a series of tie rods may be provided to connect the top edges of the sidewalls 12 to brace them, particularly when the tank is empty and the platform is in its lower, collapsed position.

A series of rubber pads may be arranged along the top edges of the girders 18 to cushion the platform 16 in its lower position.

I claim:
1. A cargo container comprising:
 a. a rigid horizontal floor;
 b. continuous, permanently rigid upstanding protective outer sidewalls bounding a cargo-containing space and fixedly mounted peripherally on said floor;
 c. a rigid platform capable of carrying a load of solid cargo and movable vertically within the cargo-containing space to and between an upper limit position and a lower limit position, said platform being guided in its movement by said continuous, permanently rigid outer sidewalls;
 d. a sleeve of flexible fluid-impermeable material having a plurality of corrugations in the manner of a concertina, one end of which sleeve is secured in fluid-tight fashion peripherally to the underside of said platform adjacent the walls and the other end of which sleeve is secured in fluid-tight fashion peripherally to said rigid floor adjacent the walls so as to define together with said rigid floor and said rigid platform an expansible fluid-tight vessel within said cargo-containing space, said corrugations tending to fold the sleeve under the platform;
 e. platform support means mounted on and extending upward above said rigid horizontal floor in spaced relation from said outer sidewalls and within said expansible fluid-tight vessel to support said rigid platform in a lower position of said platform and space said platform from said rigid floor at the lower limit of said movement of said platform whereby is provided a dead space behind said platform in said lower position and between said platform support means and said surrounding outer sidewall portions;
 f. platform movement limiting means rigidly fixed to said rigid outer walls to define the upper limit position of said movement of said platform, whereby in the unexpanded condition of said vessel when said platform is supported at the lower limit of its movement on said platform support means, said flexible sleeve is folded away within said dead space between the platform and the floor and the adjacent surrounding outer sidewall portions clear of any pinching of said flexible sleeve between said platform and said platform support means, whereby, on vertical upward movement of said platform as said vessel expands, said flexible sleeve extends in concertinalike fashion, and whereby when the vessel is in an expanded condition, said corrugations of said flexible sleeve are supported externally of the vessel against pressure from within the vessel by said continuous, permanently rigid outer sidewalls and the sleeve is protected from external damaging influences by said continuous permanently rigid outer walls.

2. A cargo container according to claim 1, wherein there is further provided at least one elongate bracing element adapted to cooperate with said platform movement limiting means and said platform to brace the platform against said platform support means and to fix the platform in its lower limit position and wherein a door is provided in the continuous rigid outer sidewalls to facilitate lateral access to the cargo-containing space when the platform is in its lower limit position.